United States Patent [19]

Matz et al.

[11] Patent Number: 5,032,295
[45] Date of Patent: Jul. 16, 1991

[54] POLYMERS FOR USE IN DRILLING MUDS

[75] Inventors: Gary F. Matz, Hixson; James C. Long, Harrison, both of Tenn.

[73] Assignee: National Starch and Chemical Investment Holding Corporation, Wilmington, Del.

[21] Appl. No.: 342,897

[22] Filed: Apr. 25, 1989

[51] Int. Cl.$^5$ .............. C08F 30/02; C09K 7/02
[52] U.S. Cl. ................ 252/8.51; 252/8.511; 252/8.513; 252/8.514; 526/273; 526/277; 526/278
[58] Field of Search .............. 526/273, 277, 278, 287, 526/288; 252/8.51, 8.511, 8.513, 8.514

[56] References Cited

U.S. PATENT DOCUMENTS

| | | | |
|---|---|---|---|
| 2,552,775 | 5/1951 | Fischer | 252/8.5 |
| 3,203,938 | 8/1965 | Baechtold | 260/79.3 |
| 3,706,717 | 12/1972 | Siegele | 260/78.5 |
| 3,734,856 | 5/1973 | Son, Jr. | 252/8.5 |
| 3,764,530 | 10/1973 | Burland et al. | 252/8.5 |
| 3,985,659 | 10/1976 | Felicetta et al. | 252/8.5 |
| 4,341,645 | 7/1982 | Blattel et al. | 252/8.5 |
| 4,451,628 | 5/1984 | Dammann | 526/225 |
| 4,460,758 | 7/1984 | Peiffer et al. | 526/287 |
| 4,476,029 | 10/1984 | Sy et al. | 252/8.5 |
| 4,489,180 | 12/1984 | Lundberg et al. | 252/8.5 C X |
| 4,502,964 | 3/1985 | Giddings et al. | 252/8.5 |
| 4,502,965 | 3/1985 | Giddings et al. | 252/8.5 |
| 4,518,510 | 5/1985 | Gleason et al. | 252/8.5 |
| 4,521,578 | 6/1985 | Chen et al. | 526/288 |
| 4,536,292 | 8/1985 | Matz | 210/701 |
| 4,554,307 | 11/1985 | Farrar et al. | 524/425 |
| 4,581,147 | 4/1986 | Branch, III | 252/8.5 |
| 4,594,169 | 6/1986 | Saito et al. | 252/8.5 |
| 4,650,593 | 3/1987 | Slingerland | 252/8.5 |
| 4,652,623 | 3/1987 | Chen et al. | 526/287 |
| 4,655,942 | 4/1987 | Dickert, Jr. et al. | 252/8.5 |
| 4,675,119 | 6/1987 | Farrer et al. | 252/8.514 |
| 4,678,591 | 7/1987 | Giddings et al. | 252/8.514 |
| 4,680,128 | 7/1987 | Portnoy | 252/8.5 |
| 4,709,767 | 12/1987 | Alexander | 175/65 |
| 4,710,555 | 12/1987 | Peiffer et al. | 526/287 X |
| 4,711,731 | 12/1987 | Garvey et al. | 252/8.514 |
| 4,715,971 | 12/1987 | Blair | 252/8.51 |
| 4,721,576 | 1/1988 | Hale et al. | 252/8.51 |
| 4,726,906 | 2/1988 | Chen et al. | 252/8.514 |
| 4,728,445 | 3/1988 | Hale | 252/8.514 |
| 4,738,788 | 4/1988 | Aurenge | 252/8.514 |
| 4,740,318 | 4/1988 | Hale et al. | 252/8.514 |
| 4,769,078 | 9/1988 | Tso | 106/287.25 |
| 4,770,795 | 9/1988 | Giddings et al. | 252/8.514 |
| 4,782,120 | 11/1988 | Rousett et al. | 525/326.6 |
| 4,837,288 | 6/1989 | Peiffer et al. | 526/287 X |
| 4,946,916 | 8/1990 | Peiffer et al. | 526/287 X |

FOREIGN PATENT DOCUMENTS

| | | |
|---|---|---|
| 122073 | 10/1984 | European Pat. Off. ............ 526/287 |
| 0137412 | 4/1985 | European Pat. Off. . |
| 157907A2 | 10/1985 | European Pat. Off. . |
| 0182600 | 5/1986 | European Pat. Off. . |
| 2133021A | 7/1984 | United Kingdom . |
| 2148981A | 6/1985 | United Kingdom . |

Primary Examiner—Robert L. Stoll
Assistant Examiner—Gary L. Geist
Attorney, Agent, or Firm—Edwin H. Szala; Ellen T. Dec

[57] ABSTRACT

A polymer for use as a deflocculant in drilling muds comprising at least one unsaturated carboxylic acid or its anhydride or salt, at least one unsaturated sulfonic acid or its salt, at least one unsaturated cationic-containing monomer, and optionally, one or more unsaturated non-ionic monomer and/or one mono or di phosphate ester of an unsaturated alcohol.

37 Claims, No Drawings

POLYMERS FOR USE IN DRILLING MUDS

BACKGROUND OF THE INVENTION

Field of the Invention

It is well known that in perforating earthen formations to tap subterranean deposits such as gas or oil, that perforation is accomplished by well drilling tools and a drilling fluid. These rotary drilling systems consist of a drilling bit fitted with appropriate 'teeth', then a set of pipes assembled rigidly together end to end, the diameter of which is smaller than that of the drilling bit. This whole rigid piece of equipment, drill bit and drill pipe string, is driven into rotation from a platform situated above the well being drilled. As the drill bit attacks and goes through the geological strata, the crushed mineral materials must be cleared away from the bottom of the hole to enable the drilling operation to continue. Aqueous clay dispersion drilling fluids are recirculated down through the hollow pipe, across the face of the drill bit, and upward through the hole.

The drilling fluid serves to cool and lubricate the drill bit, to raise the drilling cuttings to the surface of the ground, and to seal the sides of the well to prevent loss of water and drilling fluids into the formation through which the drill hole is being bored. After each passage through the well, the mud is passed through a settling tank or trough wherein the sand and drill cuttings are separated, with or without screening. The fluid is then again pumped into the drill pipe by a mud pump.

Some of the most serious problems encountered in producing and maintaining effective clay-based aqueous drilling fluids are caused by the interaction of the mud with the earth formation being drilled. These interactions include contamination of the mud by formation fluids, incorporation into the mud of viscosity producing and inert drilled solids, chemical contamination by drilled solids, or by the infiltration of sea-water and/or fresh water. The conditions of high temperature and pressure inherent with deeper and deeper drilling operations, together with formation interactions, make drilling fluid behavior unreliable and difficult to reproduce.

Characteristics of a ideal drilling fluid would then include the following:

i) To have rheological characteristics as desirable as possible to be able to transport the mineral cuttings set in dispersion.
ii) To allow the separation of cuttings by all known means as soon as the mud flows out of the hole.
iii) To have such required density as to exert sufficient pressure on the drilled geological formations.
iv) To retain its fundamental rheological qualities as it is submitted, in very deep drilling, to higher and higher temperatures.

Ammonium and alkali metal salts of polymers of acrylic acid have been taught for use as a protective colloid for water based drilling fluids, as for example in U.S. Pat. Nos. 2,552,775 and 3,764,530. Further, U.S. Pat. Nos. 3,706,717 and 3,203,938 teach the use of copolymers of acrylic acid, acrylamide, or mixtures thereof and alkali metal ethylene sulfonates in drilling muds. Polyacrylic acid alone and with sulfonated styrene-maleic anhydride copolymer were taught as high temperature dispersants for water based bentonite clay drilling fluids in U.S. Pat. No. 4,476,029. U.S. Pat. No. 4,680,128 teaches the use of acrylic acid-vinyl sulfonic acid copolymers as dispersants and high temperature deflocculants for the stabilization of the rheological properties of aqueous clay based drilling fluids. U.K. Patent Application GB 2,133,021 A teaches the use of polymers made from acrylic acid, acrylamide, and a phosphate ester of ethylene glycol monomethacrylate as a thinning adjuvant for sea water based drilling muds. U.S. Pat. Nos. 4,728,445 and 4,721,576 teach the use of sulfonated styreneitaconic acid copolymers as improving the rheological characteristics of aqueous well drilling fluids. U.S. Pat. No. 4,770,795 teaches the use of copolymers of sulfoethyl and/or sulfophenyl acrylamide as calcium tolerant deflocculants for drilling fluids.

The polymers of the current art do not provide adequate predictable drilling fluid rheology after exposure to the common downhole hazards. Moreover, these drilling fluids tend to flocculate after exposure to typical deep well drilling conditions.

It is an object of the present invention to provide a method of preventing the flocculation of drilling muds and maintenance of adequate drilling fluid rheology after exposure to typical deep well drilling conditions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, there is provided a polymer having a molecular weight of from 500 to 5,000,000 and intrinsic viscosity, measured in 1N NaCl at 25° C. and pH 9, of greater than 0.01 dl/gm comprising:

(A) 1.0 to 99.0%, on a molar basis, of at least one unsaturated carboxylic acid, or its anhydride or salt selected from the group consisting of acrylic acid, methacrylic acid, vinyl acetic acid, allyl acetic acid, maleic acid, itaconic acid, fumaric acid, $\beta$-hydroxy ethyl acrylate, 4-methyl-4-pentenoic acid, $\alpha$-haloacrylic acid, $\beta$-carboxyethylacrylate, their salts and mixtures thereof;

(B) 0.1 to 25.0%, on a molar basis, of at least one unsaturated sulfonic acid or its salt selected from the group consisting of 2-acrylamido-2-methyl propyl sulphonic acid (AMPS ®), 2-methacrylamido-2-methyl propyl sulfonic acid (MAMPS), styrene sulfonic acid (SSA), vinyl sulfonic acid (VSA), sulfoalkylacrylates or methacrylates, n-sulfoalkyl acrylamides or methacrylamides, allyl sulfonic acid (ASA), methallyl sulfonic acid (MSA), allyl glycidyl ether sulfonate (COPS 1 ®) and mixtures thereof;

(C) 0.1 to 25.0%, on a molar basis, of at least one unsaturated cationic-containing monomers selected from the group consisting of methacroyloxy ethyl trimethyl ammonium chloride (METAC), methacrylamido propyl trimethyl ammonium chloride (MAPTAC), acroyloxy ethyl trimethyl ammonium chloride (AETAC), acrylamido methyl propyl trimethyl ammonium chloride (AMPTAC), dimethyl diallyl ammonium chloride (DMDAAC), diethyl diallyl ammonium chloride (DEDAAC), trimethyl allyloxyethyl ammonium chloride (TAAC), or alternatively the respective methylsulfate quats and mixtures thereof; and (D) 0 to 90%, on a molar basis, of one or more unsaturated non-ionic monomer selected from the group consisting of acrylamide or methacrylamide, or alternatively, in place of (D), (D') and (E') defined as:

(D') 0 to 90%, on a molar basis, of one or more unsaturated non-ionic monomers selected from the group consisting of acrylamide, methacrylamide, hydroxy ethyl methacrylate, hydroxy ethyl acrylate, allyl alcohol or allyl glycerol ether; and 0.1 to 25% on a molar basis, of at least one mono or di phosphate ester of an unsaturated alcohol selected from the group consisting of hydroxy ethyl methacrylate phosphate ester (HEMPO), hydroxy ethyl acrylate phosphate ester (HAPO), allyl glycerol ether phosphate ester (AGEP), allyl alcohol phosphate ester (AAP) or hydroxy ethyl-$\beta$ carboxy ethyl acrylate phosphate ester.

DESCRIPTION OF THE INVENTION

The instant invention is directed to a polymer or admixtures thereof, having a molecular weight of from 500 to 5,000,000 prepared from:

(A) 1.0 to 99.0%, preferably 70 to 98% on a molar basis, of at least one unsaturated carboxylic acid, or its anhydride or salt;

(B) 0.1 to 25.0%, preferably 0.2 to 10.0% on a molar basis, of at least one unsaturated sulfonic acid or its salt;

(C) 0.1 to 25.0%, preferably 0.2 to 10.0% on a molar basis, of at least one unsaturated cationic-containing monomer; and (D) 0 to 90% on a molar basis, of one or more unsaturated non-ionic monomer, or alternatively, the additional presence of (E) 0.1 to 25%, preferably 0.2 to 10.0%, on a molar basis, of at least one mono or di phosphate ester of an unsaturated alcohol or its salt.

The instant invention is also directed to an aqueous drilling fluid comprising:

(A) an aqueous clay dispersion; and (B) the above-described polymer or admixture The clay dispersion can be any finely divided solid which is capable of being dispersed or suspended in an aqueous liquid vehicle. Ordinarily, such material will include hydratable clay or colloidal clay bodies such as Wyoming bentonite, commercial medium-yield drilling clays mined in various locations such as in Texas, Tennessee and Louisiana, and those produced when clay subsurface formations are drilled. Weighting materials added to increase specific gravity such as barites, iron ore, and the like can also be included.

The aqueous medium may be fresh water such as is obtained from wells or streams; it may be salt water from the sea or from wells; or it can even include oil-in-water emulsions which can form when small amounts of oil is added to gain some desired advantage. The polymers of the instant invention were found to be particularly effective in salt water and/or weighted muds and to be stable at high temperatures. The drilling mud containing the polymers of the instant invention exhibited particularly stable, desirable rheology.

It is contemplated that drilling fluids of the invention can also contain other additives besides the polymers of the invention. Materials such as caustic, quebracho, lime and the like can be added to the drilling mud at the surface while other materials such as gypsum, shale and the like can be encountered in subsurface formations during drilling operations.

When employed in accordance with the invention, the polymer can be added directly to the drilling mud as a dry powder, as a slurry suspended in a suitable liquid, as an emulsion, or as a solution in water or some other suitable solvent, and they can be incorporated therein at any convenient point in the mud circulation system. One can employ a mixing device such as a cone and jet mixer or the equivalent for incorporating the additive in the mud. The polymer may be partially or fully neutralized as desired by the practitioner.

Any unsaturated carboxylic acid or its salts can be used in preparing the polymer. Examples include acrylic acid, methacrylic acid, vinyl acetic acid, allyl acetic acid, maleic acid, itaconic acid, fumaric acid, $\beta$-hydroxy ethyl acrylate, 4-methyl-4-pentenoic acid, $\alpha$-haloacrylic acid, $\beta$-carboxyethylacrylate their salts and mixtures thereof. The preferred carboxylic functional monomers are acrylic acid, methacrylic acid and maleic acid.

Any unsaturated sulfonic acid or its salt can be used. Examples include 2-acrylamido-2-methyl propyl sulfonic acid (AMPS®), 2-methacrylamido-2-methyl propyl sulfonic acid (MAMPS), styrene sulfonic acid (SSA), vinyl sulfonic acid (VSA), sulfoalkylacrylates or methacrylates, n-sulfoalkyl acrylamides or methacrylamides, allyl sulfonic acid (ASA), methallyl sulfonic acid (MSA), allyl qlycidyl ether sulfonate (COPS 1®), their salts and mixtures thereof. The preferred sulfonic acid compounds are AMPS®, MSA, SSA, VSA and COPS 1®.

Any unsaturated cationic-containing compound can be used. Specific examples of the most preferred cationic-containing monomers include quaternary ammonium containing compounds such as methacroyloxy ethyl trimethyl ammonium chloride (METAC), methacrylamido propyl trimethyl ammonium chloride (MAPTAC), acroyloxy ethyl trimethyl ammonium chloride (AETAC), acrylamido methyl propyl trimethyl ammonium chloride (AMPTAC), dimethyl diallyl ammonium chloride (DMDAAC), diethyl diallyl ammonium Chloride (DEDAAC), trimethyl allyloxyethyl ammonium chloride (TAAC), or alternatively the methylsulfate analogs and mixtures thereof. The most preferred cationic-containing monomers are METAC, MAPTAC and DMDAAC.

The polymer can also be prepared by polymerizing a monomer containing a tertiary amine as the pendent group with subsequent quaternization of the nitrogen in the polymer to form the cationic moiety. Likewise, sulfur and/or phosphorous containing monomers can be exhaustively alkylated to form cations.

Any non-ionic monomer can optionally be used. Examples include acrylamide and its derivatives, allyl alcohol and its derivatives and any other neutral water soluble compounds commonly used in polymerizations. Any mixture of non-ionic monomers can be used in preparing the polymer.

Alternatively, if at least one mono or di phosphate ester is added, any mono or di phosphate ester of an unsaturated alcohol can be used. Examples include hydroxy ethyl methacrylate phosphate ester (HEMPO), hydroxy ethyl acrylate phosphate ester (HAPO), allyl glycerol ether phosphate ester (AGEP), allyl alcohol phosphate ester (AAP) or hydroxy ethyl-$\beta$ carboxy ethyl acrylate phosphate ester. The preferred phosphate ester containing monomers are HEMPO, HAPO, AGEP and AAP.

When this mono or di phosphate ester is added, any non-ionic monomer can optionally be used. Examples include acrylamide or its derivatives, acrylic or methacrylic hydroxy esters such as hydroxyethyl methacrylate for example, allyl alcohol and its derivatives such as allyl glycerol ether for example, and any other neutral water soluble compounds commonly used in polymerizations. Any mixture of non-ionic monomers can be used in preparing the polymer.

The polymers can be prepared by mixing the monomers preferably in the presence of a free radical initiator. Any free radical initiator can be used. Examples include peroxides, azo initiators and redox systems.

The polymer can be made by polymerizing in bulk, solution, inverse (water-in-oil) emulsion or suspension.

The temperature is not critical. The reaction will generally occur between 10° and 100° C. The reaction, depending on the temperature, generally takes from 2 minutes to 12 hours. Measuring for residual monomer will verify when the reaction is complete. As is known in the art, the polymerization may be terminated using mercaptoalkyl carboxylic acids or alcohols as chain terminating radicals (agents). Particularly useful are thioglycolic acid, 3-mercaptopropionic acid and 2-mercaptoethanol, as well as mixtures thereof.

The pH of the reaction mixture is not critical. The pH is generally in the range of 1.5 to 9.0.

The percent, by weight, of solids in the polymerization mixture is not critical. The preferred range is 1% to 60%.

The molecular weight of the polymers are measured by size exclusion chromatography (SEC), using various sodium polyacrylates as calibration standards. The resultant weight and number average molecular weight determinations are dependent on the calibration samples employed. An alternative method is to measure the intrinsic viscosity, which also gives a relative approximation of polymer size. The preferred weight average molecular weight is 1,000 to 5,000,000 with polydispersity of less than 2.0. The preferred intrinsic viscosity will generally be greater than 0.01 as measured in 1N sodium chloride solution at 25° C. and fitting the data to the Huggins equation.

When the polymer of the instant invention has molecular weight less than 50,000 and intrinsic viscosity less than 1 dl/gm, generally, 0.1-2 pounds of polymer per barrel of drilling fluid is sufficient to prevent flocculation of the additives in the drilling fluid, although 0.1-10 pounds per barrel may be needed. The amount of polymer needed is generally related to the solids content of the drilling fluid, so that increases in the solids content of the drilling mud generally increase the polymer requirement. The dosage can also be increased with higher concentration of calcium in the mud.

Similarly, when the weight of the instant polymer is greater than 50,000, and/or its intrinsic viscosity is greater than 1 dl/gm, the polymer can be added to prevent excessive drilling fluid penetration into the surrounding formation, generally termed filtration control. Any quantity which achieves filtration control can be used. Ordinarily, satisfactory results with regard to water loss reduction will be obtained with quantities ranging between one to four pounds per 42-gallon barrel of drilling mud. For optimum reduction in filtration rate with certain drilling muds, however, quantities up to 6 pounds per 42-gallon barrel may be required.

The following examples serve to illustrate the polymer of the present invention having a molecular weight range of from 500 to 500,000, and intrinsic viscosity, measured in 1N NaCl at 25° C. and pH 9, of less than 1.0 dl/gm comprising:

(A) 1 0 to 99.0%, preferably 70 to 98% on a molar basis, of at least one unsaturated carboxylic acid, or its anhydride or salt;
(B) 0.1 to 25.0%, preferably 0.2 to 10.0% on a molar basis, of at least one unsaturated sulfonic acid or its salt;
(C) 0.1 to 25.0%, preferably 0.2 to 10.0% on a molar basis, of at least one unsaturated cationic-containing monomer and
(D) 0 to 90% on a molar basis, of one or more unsaturated non-ionic monomer.

EXAMPLE 1

A monomer solution was prepared by mixing 369 grams of glacial acrylic acid, 79 grams of 75% METAC solution (sold commercially as MADQUAT Q6® by Alcolac) and 131 grams of 50% Sodium AMPS® (sold commercially as Lubrizol 2403). A second solution was made by mixing 0.006 gram of ferrous ammonium sulfate hexahydrate (FAS), 0.3 gram of erythorbic acid (E-Acid) and 21 grams of water. A third solution was made by mixing 7.5 grams of ammonium persulfate (APS) and 76.5 grams of water. Into a 2-liter reaction flask, 218 grams of water, 195 grams of the monomer solution, 7 grams of the E-Acid/FAS solution and 7 grams of thioglycolic acid was added. The solution was mixed at 24° C. and 25 grams of the APS solution was added. The solution was observed for several minutes after which time the temperature rose from 24° to 90° C. The temperature was maintained above 90° C. for about 20 minutes after which time the reaction mixture was cooled. An additional 195 grams of monomer solution, 7 grams of E-Acid/FAS solution and 7 grams of thiogylycolic acid wa added and mixed at 35° C. at which time 25 grams of APS solution was added. After observing the reaction mixture for several minutes, the temperature increased from 35° to 98° C. The temperature was maintained above 90° C. for about 20 minutes after which time the reaction mixture was cooled. An additional 195 grams of monomer solution, 7 grams of E-Acid/FAS solution and 7 grams of thiogylycolic acid was added and mixed at 50° C. at which time 25 grams of APS solution was added. After observing the reaction mixture for several minutes, the temperature increased from 50° to 97° C. The temperature was maintained above 90° C. for about 10 minutes after which time the remaining APS solution was added and the reaction temperature was maintained above 90° C. for about 20 minutes and then cooled. The resulting terpolymer had Mw=4900, Mw/Mn=1.5 and $[\eta]=0.199$ dl/gm.

EXAMPLE 2

A monomer solution was prepared by mixing 246 grams of glacial acrylic acid, 79 grams of 75% METAC solution and 131 grams of 50% Sodium AMPS® and 232 grams of 50% acrylamide solution. A second solution was made by mixing 0.006 gram of ferrous ammonium sulfate hexahydrate (FAS), 0.3 gram of erythorbic acid (E-Acid) and 21 gram of water. A third solution was made by mixing 7.5 grams of ammonium persulfate (APS) and 76.5 grams of water. Into a 2-liter reaction flask, 211 grams of water, 225 grams of the monomer solution, 7 grams of the E-Acid/ FAS solution and 7 grams of thioglycolic acid wa added. The solution was mixed at 30° C. and 25 grams of the APS solution was added. The solution was observed for several minutes after which time the temperature rose from 30° to 97° C. The temperature was maintained above 90° C. for about 20 minutes after which time the reaction mixture was cooled. An additional 225 grams of monomer solution, 7 grams of E-Acid/FAS solution and 7 grams of thiogylycolic acid was added and mixed at 31° C. at which time 25 grams of APS solution was added. After observing the reaction mixture for several minutes, the temperature increased from 31° to 83° C. The temperature was maintained above 90° C. for about 20 minutes after which time the reaction mixture was cooled. An additional 225 grams of monomer solution, 7 grams of E-Acid/FAS solution and 7 grams of thiogylycolic acid was added and mixed at 45° C. at which time 25 grams of APS solution was added.

After observing the reaction mixture for several minutes, the temperature increased from 45° to 80° C. The temperature was maintained above 90° C. for about 10 minutes after which time the remaining APS solution was added and the reaction temperature was maintained above 90° C. for about 20 minutes and then cooled. The resulting copolymer had Mw=5,300, Mw/Mn=1.6 and [$\eta$]=0.122 dl/gm.

EXAMPLE 3

A monomer solution was prepared by mixing 159 grams of glacial acrylic acid, 76 grams of 75% METAC solution and 125 grams of 50% Sodium AMPS®. A second solution was made by mixing 0.003 gram of ferrous ammonium sulfate hexahydrate (FAS), 0.1 gram of erythorbic acid (E-Acid) and 21 grams of water. A third solution was made by mixing 4.0 grams of ammonium persulfate (APS) and 80 grams of water. Into a 2-liter reaction flask, 174 grams of water, 180 grams of the monomer solution, 10 grams of the E-Acid/FAS solution and 6 grams of thioglycolic acid was added. The solution was mixed at 30° C. and 38 grams of the APS solution was added. The solution was observed for several minutes after which time the temperature rose from 30° to 93° C. The temperature was maintained above 90° C. for about 20 minutes after which time the reaction mixture was cooled. An additional 180 grams of monomer solution, 11 gram of E-Acid/FAS solution and 6 grams of thiogylycolic acid was added and mixed at 45° C. at which time 38 grams of APS solution was added. After observing the reaction mixture for several minutes, the temperature increased from 45° to 87° C. The temperature was maintained above 90° C. for about 20 minutes after which time the remaining APS solution was added and the reaction temperature was maintained above 90° C. for about 20 minutes and then cooled. The resulting terpolymer had Mw=4,550, Mw/Mn=1.6 and [$\eta$]=0.084 dl/gm.

EXAMPLE 4

A monomer solution was prepared by mixing 247 grams of glacial acrylic acid, 53 grams of 75% METAC solution and 39.5 grams of 50% Sodium AMPS®. A second solution was made by mixing 0.006 gram of ferrous ammonium sulfate hexahydrate (FAS), 0.3 gram of erythorbic acid (E-Acid) and 21 grams of water. A third solution was made by mixing 7.5 grams of ammonium persulfate (APS) and 76.5 grams of water. Into a 2-liter reaction flask, 218 grams of water, 170 grams of the monomer solution, 7 grams of the E-Acid/FAS solution and 7 grams of thioglycolic acid was added. The solution was mixed at 24° C. and 25 grams of the APS solution was added. The solution was observed for several minutes after which time the temperature rose from 24° to 99° C. The temperature was maintained above 90° C. for about 20 minutes after which time the reaction mixture was cooled. An additional 170 grams of monomer solution, 7 grams of E-Acid/FAS solution and 7 grams of thiogylycolic acid was added and mixed at 35° C. at which time 25 grams of APS solution was added. After observing the reaction mixture for several minutes, the temperature increased from 35° to 98° C. The temperature was maintained above 90° C. for about 10 minutes after which time 2 grams of 35% hydrogen peroxide was added and the reaction temperature was maintained above 90° C. for about 5 minutes. The hydrogen peroxide addition was repeated 3 times, the reaction temperature was maintained above 90° C. for about 20 minutes and then cooled. The resulting terpolymer had Mw=5,000, Mw/Mn=1.5 and [$\eta$]=0.136 dl/gm.

EXAMPLE 5

A monomer solution was prepared by mixing 247 grams of glacial acrylic acid, 53 grams of 75% METAC solution and 88 grams of 50% Sodium AMPS®. A second solution was made by mixing 0.006 gram of ferrous ammonium sulfate hexahydrate (FAS), 0.3 gram of erythorbic acid (E-Acid) and 21 grams of water. A third solution was made by mixing 7.5 grams of ammonium persulfate (APS) and 76.5 grams of water. Into a 2-liter reaction flask, 218 grams of water, 194 grams of the monomer solution, 7 grams of the E-Acid/FAS solution and 7 grams of thioglycolic acid was added. The solution was mixed at 18° C. and 25 grams of the APS solution was added. The solution was observed for several minutes after which time the temperature rose from 18° to 98° C. The temperature was maintained above 90° C. for about 20 minutes after which time the reaction mixture was cooled. An additional 194 grams of monomer solution, 7 grams of E-Acid/FAS solution and 7 grams of thiogylycolic acid was added and mixed at 35° C. at which time 25 grams of APS solution was added. After observing the reaction mixture for several minutes, the temperature increased from 35° to 97° C. The temperature was maintained above 90° C. for about 10 minutes after which time 2 grams of 35% hydrogen peroxide was added and the reaction temperature was maintained above 90° C. for about 5 minutes. The hydrogen peroxide addition was repeated 3 times, the reaction temperature was maintained above 90° C. for about 20 minutes and then cooled. The resulting terpolymer had Mw=4,400, Mw/Mn=1.5 and [$\eta$]=0.105 dl/gm.

EXAMPLE 6

A monomer solution was prepared by mixing 246 grams of glacial acrylic acid, 88 grams of 75% METAC solution and 25.6 grams of 50% Sodium AMPS®. A second solution was made by mixing 0.006 gram of ferrous ammonium sulfate hexahydrate (FAS), 0.3 grams of erythorbic acid (E-Acid) and 21 grams of water. A third solution was made by mixing 7.5 grams of ammonium persulfate (APS) and 76.5 grams of water. Into a 2-liter reaction flask, 218 grams of water, 180 grams of the monomer solution, 7 grams of the E-Acid/FAS solution and 7 grams of thioglycolic acid was added. The solution was mixed at 18° C. and 25 grams of the APS solution was added. The solution was observed for several minutes after which time the temperature rose from 18° to 98° C. The temperature was maintained above 90° C. for about 20 minutes after which time the reaction mixture was cooled. An additional 180 grams of monomer solution, 7 grams of E-Acid/FAS solution and 7 grams of thiogylycolic acid was added and mixed at 34° C. at which time 25 grams of APS solution was added. After observing the reaction mixture for several minutes, the temperature increased from 34° to 97° C. The temperature was maintained above 90° C. for about 10 minutes after which time 2 grams of 35% hydrogen peroxide was added and the reaction temperature was maintained above 90° C. for about 5 minutes. The hydrogen peroxide addition was repeated 3 times, the reaction temperature was maintained above 90° C. for about 20 minutes and then cooled. The resulting terpolymer had Mw=4,300, Mw/Mn=1.4 and $[\eta]$=0.096 dl/gm.

EXAMPLE 7

A monomer solution was prepared by mixing 253 grams of glacial acrylic acid, 44 grams of 75% METAC solution and 25.6 grams of 50% Sodium AMPS ®. A second solution was made by mixing 0.006 gram of ferrous ammonium sulfate hexahydrate (FAS), 0.3 gram of erythorbic acid (E-Acid) and 21 grams of water. A third solution was made by mixing 7.5 grams of ammonium persulfate (APS) and 76.5 grams of water. Into a 2-liter reaction flask, 218 grams of water, 161 grams of the monomer solution, 7 grams of the E-Acid/FAS solution and 7 grams of thiogylycolic acid was added. The solution was mixed at 22° C. and 25 grams of the APS solution was added.

The solution was observed for several minutes after which time the temperature rose from 22° to 99° C. The temperature was maintained above 90° C. for about 20 minutes after which time the reaction mixture was cooled. An additional 161 grams of monomer solution, 7 grams of E-Acid/FAS solution and 7 grams of thiogylycolic acid was added and mixed at 30° C. at which time 25 grams of APS solution was added. After observing the reaction mixture for several minutes, the temperature increased from 30° to 97° C. The temperature was maintained above 90° C. for about 10 minutes after which time 2 grams of 35% hydrogen peroxide was added and the reaction temperature was maintained above 90° C. for about 5 minutes. The hydrogen peroxide addition was repeated 3 times, the reaction temperature was maintained above 90° C. for about 20 minutes and then cooled. The resulting terpolymer had Mw=4,100, Mw/Mn=1.4, and $[\eta]$=0.101 dl/gm.

EXAMPLE 8

A monomer solution was prepared by mixing 330 grams of acrylic acid, 98 grams of 75% METAC solution and 161 grams of 50% sodium AMPS ® solution, 206 grams deionized water and 70 grams of a 50% sodium hydroxide solution. Into a 2-liter reaction vessel 173 grams of maleic anhydride, 300 grams deionized water, 140 grams of a 50% sodium hydroxide solution and 0.018 gram of ferrous ammonium sulfate was added and warmed to 95° C. At this point 1.2 grams of a 35% hydrogen peroxide solution was added to the reaction vessel. The monomer mixture and 44 ml of 3-mercaptopropionic acid were added to the reaction vessel continuously over a seven hour period. 132 grams of a 35% hydrogen peroxide solution was added over the duration of the monomer mixture addition plus twenty minutes. The reaction mixture warmed to 103° C. and was thereafter maintained between 95° C. and 100° C. for the duration of the addition. The resulting polymer had Mw=4,400, Mw/Mn=1.6, and $[\eta]$=0.074 dl/gm.

COMPARATIVE EXAMPLE 1

A commercial polymer made from acrylic acid, acrylamide and a phosphate ester of ethylene glycol monomethacrylate with Mw=6,400, Mw/Mn=1.8, and $[\eta]$=0.109 dl/gm.

COMPARATIVE EXAMPLE 2

A copolymer made from acrylic acid and AMPS ® mixed at a 90/10 weight ratio and sold under the trade name Alcodrill HPD by Alco Chemical Corporation with Mw=3,970, Mw/Mn=1.4 and $[\eta]$=0.083 dl/gm.

To illustrate the invention, the following procedure was processed with the results recorded in Table I:

METHOD A

Representative mud systems were used for testing these copolymers. Freshwater Drilling Fluid: first a base mud was prepared by adding 300.0 g of bentonite clay and 500.0 g of simulated drilled solids (Rev Dust ® from Millwhite Company of Houston, Tex.) to 5,000 g of deionized water. The slurry was mixed under strong agitation for one hour and then allowed to statically age for 24 hours. The base mud was then converted to 350 ml standard laboratory barrels of mud by the following procedure. To 275 g of base mud enough sodium hydroxide was added to adjust the pH to 10.5. Under agitation 3.0 g of lignite was added for fluid loss control and 425 g of barite to increase the mud density to 15.5 lb/gal. Then it was treated with copolymer deflocculant and allowed to throughly mix.

After initial mixing the testing muds were placed in 16 oz. glass mason jars and heat aged at 150° F. for 16 hours under roller agitation. At the end of the aging period the jars were placed in a tap water bath and cooled to ambient temperature. The pH was readjusted to 10.5 and the muds were thoroughly mixed. Then the rheological properties were measured using API procedure RP13B and a Fann 35-A Viscometer.

Upon completion of the rheology measurements the testing muds were placed into aging cells, which were sealed and pressurized with nitrogen. The muds were then statically aged at 350° F. for 16 hours. Following aging the muds were cooled to ambient temperature and the pH measured. The muds were then thoroughly mixed and measured for rheological properties. The test data in Table I illustrated the effectiveness of the invention to control viscosity over a broad range of temperatures.

METHOD B

This example demonstrates the effectiveness of the present invention when exposed to seawater drilling conditions. First a base mud was prepared by adding 500 g of bentonite clay and 700 g of Rev Dust ® to 5000 g of deionized water. The slurry was mixed under strong agitation for 1 hour and then allowed to set quiescent for 24 hours. The base mud was then used in making the test muds by the following procedure. To a 250 ml aliquot of base mud add 100 ml of water containing 18.9 g of Sea Salt (Lake Products Company, Ballwin, Mo.) and adjust the pH to 10.5 using sodium hydroxide. Add 5 g of synthetic fluid loss additive and 425 g of barite to bring the mud density to 15.0 lb/gal. Then treat the test mud with copolymer deflocculant and thoroughly mix.

After the initial mixing the test muds were heat aged under roller agitation for 16 hours at 150° F. Following heat aging the test muds were cooled to ambient temperature in a circulating water bath. The pH of each sample was adjusted to 10.0 before mixing under strong agitation. Then the rheological properties were measured using a Fann 35-A Viscometer.

The mud samples were then statically aged for 16 hours at 350° F. After being cooled to ambient temperature the mud samples were mixed thoroughly and then checked for pH and rheology. Table I illustrates the effectiveness of the invention at controlling the rheological properties following exposure to high temperatures and high electrolyte conditions.

TABLE I

| | Polymer Concentration ppb (dry) | Freshwater Hot Rolled @ 150° F. | | | Freshwater Heat Aged @ 350° F. | | | Seawater Hot Rolled @ 150° F. | | | Seawater Heat Aged @ 350° F. | | |
|---|---|---|---|---|---|---|---|---|---|---|---|---|---|
| | | PV | YP | Gels | PV | YP | Gels | PV | YP | Gels | PV | YP | Gels |
| Example 1 | 1.35 | 77 | 43 | 15/17 | 70 | 26 | 7/10 | 40 | 91 | 53/61 | 48 | 91 | 60/66 |
| Example 2 | 1.35 | 81 | 53 | 21/20 | 72 | 26 | 9/10 | 67 | 71 | 57/84 | 67 | 156 | 110/114 |
| Example 3 | 1.35 | 84 | 48 | 8/14 | 78 | 28 | 7/10 | 98 | 98 | 64/71 | 40 | 220 | 115/116 |
| Example 4 | 1.35 | 64 | 20 | 7/7 | 78 | 21 | 5/6 | 39 | 91 | 54/63 | 43 | 78 | 53/57 |
| Example 5 | 1.35 | 61 | 18 | 6/7 | 73 | 25 | 5/6 | 36 | 76 | 50/58 | 42 | 87 | 57/62 |
| Example 6 | 1.35 | 67 | 23 | 7/7 | 78 | 29 | 5/6 | 39 | 98 | 55/63 | 50 | 101 | 70/75 |
| Example 7 | 1.35 | 57 | 27 | 7/10 | 75 | 22 | 5/6 | 33 | 104 | 60/69 | 42 | 112 | 69/71 |
| Example 8 | 1.35 | 66 | 23 | 6/8 | 107 | 82 | 46/130 | 43 | 82 | 52/62 | 45 | 220 | 105/122 |
| Comparative 1 | 1.35 | 61 | 17 | 6/6 | 77 | 20 | 5/6 | 37 | 67 | 47/53 | 46 | 104 | 60/62 |
| Comparative 2 | 1.35 | 74 | 39 | 14/19 | 83 | 28 | 10/13 | 45 | 55 | 43/49 | 51 | 129 | 77/81 |

The following examples illustrate the effectiveness of the polymer of the present invention having a molecular weight range from 500 to 5,000,000 and an intrinsic viscosity, measured in 1N NaCl at 25° C. and pH 9, of greater than 0.01 dl/gm comprising:

(A) 1.0 to 99.0%, preferably 70 to 98% on a molar basis, of at least one unsaturated carboxylic acid, or its anhydride or salt;

(B) 0.1 to 25.0%, preferably 0.2 to 10.0% on a molar basis, of at least one unsaturated sulfonic acid or its salt;

(C) 0.1 to 25.0%, preferably 0.2 to 10.0% on a molar basis, of at least one unsaturated cationic-containing monomer;

(D) 0 to 90% on a molar basis, of one or more unsaturated non-ionic monomer; and (E) 0.1 to 25%, preferably 0.2 to 10.0%, on a molar basis, of at least one mono or di phosphate ester of an unsaturated alcohol or is salt.

EXAMPLE 1'

Into a 1000 liter reaction flask the following ingredients were added; 200 grams deionized water, 0.1 gram erythorbic acid, 0.01 gram ferrous ammonium sulfate, 15 grams thioglycolic acid, 130 grams acrylic acid, 27 grams of a 75% methocryloxyethyl trimethyl ammonium chloride (METAC) and 19 grams of hydroxyethylmethacrylate phosphate ester (HEMPO). The reaction mixture was warmed to 24° C. at which time a solution of 7 grams ammonium persulfate in 23 grams of deionized water was added. The reaction mixture was observed for several minutes after which time the temperature peaked at 103° C. Five minutes after the reaction peak, 2 grams of a 35% hydrogen peroxide solution was added. The resulting polymer solution was cooled and neutralized with 55 grams of a 50% sodium hydroxide solution. The final polymer had Mw=8100, Mw/Mn=2.7 and [η]=0.107 dl/gm.

EXAMPLES 2'

A monomer mixture was prepared by mixing 330 grams of glacial acrylic acid, 98 grams of 75% METAC solution, 105 grams of HEMPO, 250 grams deionized water and 110 grams of a 50% sodium hydroxide solution. Into a 2-liter reaction vessel 173 grams of maleic anhydride, 300 grams deionized water, 140 grams of a 50% sodium hydroxide solution and 0.01 gram of ferrous ammonium sulfate was added and warmed to 86 C°. At this point 1.2 grams of a 35% hydrogen peroxide solution was added to the reaction vessel. The monomer mixture and 44 ml of 3-mercaptopropionic acid were added to the reaction vessel continuously over a seven hour period. 241 grams of a 35% hydrogen peroxide solution was added over the duration of the monomer mixture addition plus twenty minutes. The reaction mixture warmed to 104° C. and was thereafter maintained between 95° and 100° C. for the duration of the addition. The resulting polymer had Mw=8300, Mw/Mn=2.4 and [η]=0.136 dl/gm.

EXAMPLES 3'

Into a 1000 liter reaction flask the following ingredients were added; 200 grams deionized water, 0.1 gram erythorbic acid, 0.01 gram ferrous ammonium sulfage, 10 grams thioglycolic acid, 130 grams acrylic acid, 27 grams of a 75% METAC solution, 20 grams of a 50% solution of sodium 2-acrylamido-2-methylpropanesulfonate and 10 grams of HEPO. The reaction mixture was warmed to 25° C. at which time a solution of 7 grams ammonium persulfate in 23 grams of deionized water was added. The reaction mixture was observed for several minutes after which time the temperature peaked at 105° C. Five minutes after the reaction peak, 2 grams of a 35% hydrogen perioxide solution was added to the mixture. After another five minutes an additional 2 grams of hydrogen peroxide solution was added. The resulting polymer solution was cooled and neutralized with 50 grams of a 50% sodium hydroxide solution. The final polymer had Mw=13,100 Mw/Mn=2.8 and [η]=0.124 dl/gm.

EXAMPLE 4'

A solution was made by mixing 0.1 gram of ferrous ammonium sulfate hexahydrate (FAS), 0.3 gram of erythorbic acid (E-Acid) and 21 grams of water. A second solution was made by mixing 14.0 grams of ammonium persulfate (APS) and 70.0 grams of water. Into a 2-liter reaction flask, the following ingredients were added; 320 grams of water, 100 grams of acrylic acid, 80 grams of 55 percent aqueous solution of allyl glycerol ether phosphate ester (AGEP) neutralized to pH 3.25 with sodium hydroxide, 16 grams of 62 percent aqueous solution of dimethyl diallyl ammonium chloride (DMDAAC), 5 grams of the E-Acid/FAS solution and 5 grams of 80 percent aqueous thioglycolic acid (TGA). The solution was mixed at 50° C. and 21 grams of the APS solution was added. The solution was observed for several minutes after which time the temperature rose from 50° to 95° C. The temperature was maintained above 90° C. for about 20 minutes after which time the reaction mixture was cooled. An additional 100 grams of acrylic acid, 16 grams of DMDAAC solution, 5 grams of E-Acid/FAS solution and 6 grams of TGA was added and mixed at 55° C. at which time 21 grams of APS solution was added. After observing the reaction mixture for several minutes, the temperature increased from 55° to 95° C. The temperature was maintained above 90° for about 20 minutes after which time the reaction mixture was cooled. An additional 100 grams of acrylic acid, 16 grams of DMDAAC solution, 5 grams of E-Acid/FAS solution and 7 grams of TGA was added and mixed at 60° C. at which time 21 grams of APS solution was added. After observing the reaction mixture for several minutes, the temperature increased from 60° to 92° C. The temperature was maintained above 90° C. for about 20 minutes after which time the reaction mixture was cooled. An additional 100 grams of acrylic acid, 5 grams of E-Acid/FAS solution and 8 grams of TGA was added and mixed at 65° C. at which time 21 grams of APS solution was added. After observing the reaction mixture for several minutes, the temperature increased from 65° to 92° C. The temperature was maintained above 90° C. for about 20 minutes after which time 8 grams of 35 percent aqueous hydrogen peroxide was added and temperature was maintained above 90° C. for about 20 minutes and then cooled. The resulting terpolymer had Mw=4900, Mw/Mn=1.5 and $[\eta]=0.102$ dl/gm.

EXAMPLE 5'

A solution was made by mixing 7.0 grams of ammonium persulfate (APS) and 23.0 grams of water. Into a 2-liter reaction flask, 220 grams of water, 58 grams of acrylic acid, 12 grams of a 75 percent aqueous solution of METAC, 9 grams of HEMPO, 0.1 gram of E-Acid, 0.01 gram of FAS and 8 grams of 80 percent aqueous thioglycolic acid (TGA). The solution was mixed at 40° C. and 13 grams of the APS solution was added. The solution was observed for several minutes after which time the temperature rose from 40° to 88° C. The temperature was maintained above 90° C. for about 20 minutes after which time the reaction mixture wa cooled. An additional 72 grams of acrylic acid, 15 grams of METAC solution, 10 grams of HEMPO and 10 grams of TGA was added and mixed at 45° C. at which time 17 grams of APS solution was added. After observing the reaction mixture for several minutes, the temperature increased from 45° to 91° C. The temperature was maintained above 90° C. for about 20 minutes and then cooled. The resulting terpolymer had Mw =3900, Mw/Mn =1.6 and $[n]=0.053$ dl/gm.

EXAMPLE 6'

A solution was made by mixing 3.0 grams of ammonium persulfate (APS) and 27.0 grams of water. Into a 2-liter reaction flask, 290 grams of water, 65 grams of acrylic acid, 14 grams of a 75 percent aqueous solution of METAC, 10 grams of HEMPO, 0.1 gram of E-Acid, 0.01 gram of FAS and 1.0 gram of 80 percent aqueous thioglycolic acid (TGA). The solution was mixed at 40° C. and the APS solution was added. The solution was observed from several minutes after which time the temperature rose from 40° to 100° C. The resulting polymer gel was crosslinked, water swellable and dispersible. The dry polymer was isolated by drying in a vacuum oven at 50° C.

COMPARATIVE EXAMPLE 1'

A commercial polymer containing arcylic acid, acrylamide and a phosphate ester of ethyleneglycol monomethacrylate with Mw=6400, Mw/Mn=2.8 and $[\eta]=0.109$ dl/gm.

COMPARATIVE EXAMPLE 2'

A copolymer made from a 90/10 w/w mixture of acrylic acid and AMPS® sold under the trade name Alcodrill HPD by Alco Chemical Corporation with Mw=3970, Mw/Mn=1.4 and $[\eta]=0.083$ dl/gm.

COMPARATIVE EXAMPLE 3'

A commercial product containing a high molecular weight polyanionic cellulosic polymer.

COMPARATIVE EXAMPLE 4'

A commercial polymer formulated as a sodium polyacrylate with high anionic charge and medium molecular weight.

To illustrate the invention, the following procedure was processed with the results recorded in Table I' and II':

METHOD A'

Representative mud systems were used for testing these copolymers. Freshwater Drilling Fluid: First a base mud was prepared by adding 300.0 g of bentonite clay and 500.0 g of simulated drilled solids (Rev. Dust® from Millwhite Company of Houston, Tex.) to 5,000 g of deionized water. The slurry was mixed under strong agitation for one hour and then allowed to statically age for 24 hours. The base mud was then converted to 350 ml standard laboratory barrels of mud by the following procedure. To 275 g of base mud, enough sodium hydroxide was added to adjust the pH to 10.5. Under agitation 3.0 g of lignite was added for fluid loss control and 425 g of barite to increase the mud density to 15.5 lb/gal. Then it was treated with copolymer deflocculant and allowed to thoroughly mix.

After initial mixing the testing muds were placed in 16 oz. glass mason jars and heat aged at 150° F. for 16 hours under roller agitation. At the end of the aging period the jars were placed in a tap water bath and cooled to ambient temperature. The pH was readjusted to 10.5 and the muds were thoroughly mixed. Then the rheological properties were measured using API procedure RP13B and a Fann 35-A Viscometer.

Upon completion of the rheology measurements the testing muds were placed into aging cells, which were sealed and pressurized with nitrogen. The muds were then statically aged at 350° F. for 16 hours. Following aging the muds were cooled to ambient temperature and the pH measured. The muds were then thoroughly mixed and measured for rheological properties. The test data in Table I' illustrated the effectiveness of the invention to control viscosity over a broad range of temperatures.

METHOD B'

This example demonstrates the effectiveness of the present invention when exposed to seawater drilling conditions. First a base mud was prepared by adding 500 g of bentonite clay and 700 g of Rev Dust ® to 5000 g of deionized water. The slurry was mixed under strong agitation for 1 hour and then allowed to set quiescent for 24 hours. The base mud was then used in making the test muds by the following procedure. To a 250 ml aliquot of base mud add 100ml of water containing 18.9 g of Sea Salt (Lake Products Company, Ballwin, Mo.) and adjust the pH to 10.5 using sodium hydroxide. Add 5 g of synthetic fluid loss additive and 425 g of barite to bring the mud density to 15.0 lb/gal. Then treat the mud with copolymer deflocculant and thoroughly mix.

After the initial mixing the test muds were heat aged under roller agitation for 16 hours at 150° F. Following heat aging the test muds were cooled to ambient temperature in a circulating water bath. The pH of each sample was adjusted to 10.0 before mixing under strong agitation. Then the rheological properties were measured using a Fann 35-A Viscometer.

The mud samples were then placed in aging cells and statically aged for 16 hours at 350° F. After being cooled to ambient temperature the mud samples were mixed thoroughly and then checked for pH and rheology. Table I' illustrates the effectiveness of the invention at controlling the rheological properties following exposure to high temperatures and high electrolyte conditions.

METHOD C'

This example demonstrates the effectiveness of the polymer of the present invention as a filtration control agent after being exposed to high temperature. The polymer of Example 6', along with Comparative 3' and 4', were tested in a freshwater drilling fluid with the following compositions:

| | |
|---|---|
| DI H$_2$O | 350 ml |
| Bentonite | 14 g |
| Rev Dust ® | 20 g |
| Lignosulfonate | 3 g |
| Polymer Sample | 1 g |

Each sample was adjusted to pH 10.0 and statically aged at 350° F. for 16 hours. Following aging, the muds were cooled to ambient temperature. After mixing, rheological properties and API filtrate readings were taken. The results of these tests are shown in Table II'.

METHOD D'

This sample demonstrates the effectiveness of the present invention as a filtration control agent when exposed to seawater drilling conditions and high temperature. The polymer of Example 6', along with Comparative 3' and 4', were tested in a seawater drilling fluid with the following composition:

| | |
|---|---|
| DI H$_2$O | 350 ml |
| Bentonite | 14 g |
| Sea Salt | 17.5 g |
| Rev Dust ® | 30 g |
| Lignosulfonate | 3 g |
| Polymer Sample | 1 g |

Each sample was adjusted to pH 10.0, statically aged at 350° F. for 16 hours and cooled to room temperature. Then the rheological properties and API filtrate readings were taken. The results are in Table II'.

TABLE I'

| | Polymer Concentration ppb (dry) | Freshwater Hot Rolled @ 150° F. | | | Freshwater Heat Aged @ 350° F. | | | Seawater Hot Rolled @ 150° F. | | | Seawater Heat Aged @ 350° F. | | |
|---|---|---|---|---|---|---|---|---|---|---|---|---|---|
| | | PV | YP | Gels | PV | YP | Gels | PV | YP | Gels | PV | YP | Gels |
| Example 1' | 1.35 | 55 | 13 | 5/7 | 60 | 19 | 4/5 | 34 | 93 | 48/62 | 43 | 47 | 38/45 |
| Example 2' | 1.35 | 67 | 27 | 7/9 | 97 | 38 | 5/9 | 51 | 119 | 66/74 | 43 | 100 | 63/75 |
| Example 3' | 1.35 | 54 | 16 | 6/7 | 66 | 15 | 4/6 | 36 | 79 | 45/54 | 48 | 54 | 42/51 |
| Example 4' | 1.35 | 44 | 12 | 5/7 | 48 | 13 | 4/5 | 29 | 27 | 24/62 | 42 | 90 | 74/79 |
| Example 5' | 1.35 | 43 | 10 | 5/7 | 54 | 7 | 4/5 | 32 | 57 | 43/55 | 32 | 67 | 53/59 |
| Comparative 1' | 1.35 | 66 | 25 | 7/11 | 84 | 26 | 6/10 | 52 | 37 | 28/54 | 52 | 29 | 37/55 |
| Comparative 2' | 1.35 | 61 | 29 | 8/12 | 76 | 23 | 7/12 | 45 | 55 | 43/49 | 51 | 129 | 77/81 |

TABLE II'

| | Polymer Concentration ppb (dry) | Freshwater Heat Aged @ 350° F. | | | Fluid Loss ml | Seawater Heat Aged @ 350° F. | | | Fluid Loss ml |
|---|---|---|---|---|---|---|---|---|---|
| | | PV | YP | Gel | | PV | YP | Gel | |
| Example 6' | 1.0 | 12 | 1 | 1/1 | 10.5 | 13 | 2 | 2/7 | 70.0 |
| Comparative 3' | 1.0 | 19 | 10 | 2/2 | 14.0 | 13 | 10 | 3/7 | 78.0 |
| Comparative 4' | 1.0 | 13 | 2 | 1/1 | 10.0 | 22 | 23 | 5/7 | >100.0 |
| Base Mud | — | 6 | 0 | 1/1 | 14.0 | 16 | 12 | 3/7 | >100.0 |

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the general inventive concept as defined by the appended claims and their equivalents.

What is claimed is:

1. A polymer having a molecular weight ranging from 500 to 5,000,000 and intrinsic viscosity, measured in 1N NaCl at 25° C. and pH 9, of greater than 0.01 dl/gm comprising:
  (A) 1.0 to 99.0%, on a molar basis, of at least one unsaturated carboxylic acid, or its anhydride or salt selected from the group consisting of acrylic acid, methacrylic acid, vinyl acetic acid, allyl acetic acid, maleic acid, itaconic acid, fumaric acid, β-hydroxy ethyl acrylate, 4-methyl-4-pentenoic acid, α-haloacrylic acid, β-carboxyethylacrylate, their salts and mixtures thereof;
  (B) 0.1 to 25.0%, on a molar basis, of at least one unsaturated sulfonic acid or its salt selected from the group consisting of 2-acrylamido-2-methyl propyl sulfonic acid, 2-methacrylamido-2-methyl propyl sulfonic acid (MAMPS), styrene sulfonic acid (SSA), vinyl sulfonic acid (VSA), sulfoalkylacrylates or methacrylates, n-sulfoalkyl acrylamides or methacrylamides, allyl sulfonic acid (ASA), methallyl sulfonic acid (MSA), allyl glycidyl ether sulfonate and mixtures thereof;
  (C) 0.1 to 25.0%, on a molar basis, of at least one unsaturated cationic-containing monomer selected from the group consisting of methacroyloxy ethyl trimethyl ammonium chloride (METAC), methacrylamido propyl trimethyl ammonium chloride (MAPTAC), acroyloxy ethyl trimethyl ammonium chloride (AETAC), acrylamido methyl propyl trimethyl ammonium chloride (AMPTAC), dimethyl diallyl ammonium chloride (DMDAAC), diethyl diallyl ammonium chloride (DEDAAC), trimethyl allyloxyethyl ammonium chloride (TAAC), the respective methylsulfate quats and mixtures thereof; and
  (D) 0 to 90%, on a molar basis, of one or more unsaturated non-ionic monomer selected from the group consisting of acrylamide, methacrylamide, allyl alcohol, hydroxy ethyl methacrylate, hydroxy ethyl acrylate, and allyl glycerol ether; and
  (E) 0.1 to 25% on a molar basis, of at least one mono or di phosphate ester of an unsaturated alcohol selected from the group consisting of hydroxy ethyl methacrylate phosphate ester (HEMPO), hydroxy ethyl acrylate phosphate ester (HAPO), allyl glycerol ether phosphate ester (AGEP), N,N-dimethylacrylamide allyl alcohol phosphate ester (AAP) and hydroxy ethyl-β carboxy ethyl acrylate phosphate ester.

2. An aqueous drilling fluid comprising: (I) an aqueous clay dispersion; and (II) the polymer of claim 1.

3. The polymer of claim 1, wherein the molecular weight ranges from 1,000 to 50,000 and having an intrinsic viscosity between 0.01 and 0.25 dl/gm in 1.0N NaCl at 25° C. and pH=9.

4. The polymer of claim 1, wherein the polymer has been prepared using mercaptoalkyl carboxylic acids or alcohols as chain terminating agents.

5. The polymer of claim 1, wherein said cationic-containing monomer is a monomer containing a pendant tertiary amine which was quaternized subsequent to polymerization.

6. The polymer of claim 1, wherein the polymer has been partially or totally neutralized.

7. The polymer of claim 1, wherein component (A) said unsaturated carboxylic acid is selected from the group consisting of acrylic acid, methacrylic acid and maleic acid.

8. The polymer of claim 1, wherein component (B) said sulfonic acid is selected from the group consisting of 2-acrylamido-2-methyl propyl sulfonic acid, methallyl sulfonic acid (MSA), styrene sulfonic acid (SSA), vinyl sulfonic acid (VSA), and allyl glycidyl ether sulfonate.

9. The polymer of claim 1, wherein component (C) said cationic monomer is selected from the group consisting of methacroyloxy ethyl trimethyl ammonium chloride (METAC), methacrylamido propyl trimethylammonium chloride (MAPTAC) and dimethyl diallyl ammonium chloride (DMDAAC).

10. The polymer of claim 1, wherein component (E) is selected from the group consisting of hydroxy ethyl methacrylate phosphate ester (HEMPO), hydroxy ethylacrylate phosphate ester (HAPO), allyl glycerol ether phosphate ester (AGEP), and allyl alcohol phosphate ester (AAP).

11. The polymer of claim 1, wherein component (D) is selected from the group consisting of acrylamide, N,N-dimethylacrylamide, allyl alcohol, allyl glycerol ether and hydroxy ethyl methacrylate.

12. The polymer of claim 1, wherein component B is selected from the group consisting of 2-acrylamido-2-methyl propane sulfonic acid and allyl glycidyl ether sulfonate.

13. An aqueous drilling fluid comprising (I) an aqueous clay dispersion; and (II) the polymer of claim 1 with molecular weight less than 50,000 and/or intrinsic viscosity less than 1.0 dl/gm said polymer used to disperse and/or deflocculate aqueous clay-based drilling fluid solids and control said drilling fluid rheology.

14. An aqueous drilling fluid comprising: (I) an aqueous clay dispersion; and (II) the polymer of claim 1 with molecular weight greater than 50,000 and/or intrinsic viscosity greater than 1.0 dl/gm said polymer used to achieve filtration control in said drilling fluid.

15. A polymer having a molecular weight ranging from 500 to 5,000,000 and intrinsic viscosity, measured in 1N NaCl at 25° C. and pH 9, of greater than 0.01 dl/gm comprising:
  (A) 70 to 98%, on a molar basis, of at least one unsaturated carboxylic acid, or its anhydride or salt selected from the group consisting of acrylic acid, methacrylic acid, vinyl acetic acid, allyl acetic acid, maleic acid, itaconic acid, fumaric acid, β-hydroxy ethyl acrylate, 4-methyl-4-pentenoic acid, -60-haloacrylic acid, β-carboxyethylacrylate, their salts and mixtures thereof;
  (B) 0.2 to 10.0%, on a molar basis, of at least one unsaturated sulfonic acid or its salt selected from the group consisting of 2-acrylamido-2-methyl propyl sulphonic acid, 2-methacrylamido-2-methyl propyl sulfonic acid (MAMPS), styrene sulfonic acid (SSA), vinyl sulfonic acid (VSA), sulfoalkylacrylates or methacrylates, n-sulfoalkyl acrylamides or methacrylamides, allyl sulfonic acid (ASA), methallyl sulfonic acid (MSA), allyl glycidyl ether sulfonate and mixtures thereof;
  (C) 0.2 to 10.0%, on a molar basis, of at least one unsaturated cationic-containing monomers selected from the group consisting of methacroyloxy ethyl trimethyl ammonium chloride (METAC), methacrylamido propyl trimethyl ammonium chloride (MAPTAC), acroyloxy ethyl trimethyl ammonium chloride (AETAC), acrylamido methyl propyl trimethyl ammonium chloride (AMPTAC), dimethyl diallyl ammonium chloride (DMDAAC), diethyl diallyl ammonium chloride (DEDAAC), trimethyl allyloxyethyl ammonium chloride (TAAC), the respective methylsulfate quats and mixtures thereof;

(D) 0 to 29.4, on a molar basis, of one or more unsaturated non-ionic monomers selected from the group consisting acrylamide, methacrylamide, N,N-dimethylacrylamide hydroxy ethyl methacrylate, hydroxy ethyl acrylate, allyl alcohol and allyl glycerol ether; and (E) 0.2 to 10.0% on a molar basis, of at least one mono or di phosphate ester of an unsaturated alcohol selected from the group consisting of hydroxy ethyl methacrylate phosphate ester (HEMPO), hydroxy ethyl acrylate phosphate ester (HAPO), allyl glycerol ether phosphate ester (AGEP), allyl alcohol phosphate ester (AAP) and hydroxy ethyl-$\beta$ carboxy ethyl acrylate phosphate ester.

16. An aqueous drilling fluid comprising: (I) an aqueous clay dispersion; and (II) the polymer of claim 15.

17. The polymer of claim 15, wherein the molecular weight ranges from 1,000 to 50,000 and having an intrinsic viscosity between 0.01 and 0.25 dl/gm in 1.0N NaCl at 25° C. and pH=9.

18. The polymer of claim 15, wherein the polymer has been prepared using mercaptoalkyl carboxylic acids or alcohols as chain terminating agents.

19. The polymer of claim 15, wherein said cationic-containing monomer is a monomer containing a pendant tertiary amine which was quaternized subsequent to polymerization.

20. The polymer of claim 15, wherein the polymer has been partially or totally neutralized.

21. The polymer of claim 15, wherein component (A) is selected from the group consisting of acrylic acid, methacrylic acid and maleic acid.

22. The polymer of claim 15, wherein component (B) is selected from the group consisting of 2-acrylamido-2-methyl propyl sulfonic acid, methallyl sulfonic acid (MSA), styrene sulfonic acid (SSA), vinyl sulfonic acid (VSA), and allyl glycidyl ether sulfonate.

23. The polymer of claim 15, wherein component (C) is selected from the group consisting of methacroyloxy ethyl trimethyl ammonium chloride (METAC), methacrylamdio propyl trimethyl ammonium chloride (MAPTAC) and dimethyl diallyl ammonium chloride (DMDAAC).

24. The polymer of claim 15, wherein component (E) is selected from the group consisting of hydroxy ethyl methacrylate phosphate ester (HEMPO), hydroxy ethyl acrylate phosphate ester (HAPO), allyl glycerol ether phosphate ester (AGEP), and allyl alcohol phosphate ester (AAP).

25. The polymer of claim 15 wherein component (D) is selected from the group consisting of acrylamide, N,N-dimethylacrylamide, allyl alcohol, allyl glycerol ether and hydroxy ethyl methacrylate.

26. The polymer of claim 15, wherein component (B) is selected from the group consisting of 2-acrylamido-2-methyl propane sulfonic acid and allyl glycidyl ether sulfonate.

27. An aqueous drilling fluid comprising (I) an aqueous clay dispersion; and (II) the polymer of claim 15 with molecular weight less than 50,000 and/or intrinsic viscosity less than 1.0 dl/gm said polymer used to disperse and/or deflocculate aqueous clay-based drilling fluid solids and control said drilling fluid rheology.

28. An aqueous drilling fluid comprising: (I) an aqueous clay dispersion; and (II) the polymer of claim 15 with the molecular weight greater than 50,000 and/or intrinsic viscosity greater than 1.0 dl/gm said polymer used to achieve filtration control in said drilling fluid.

29. A polymer having a molecular weight ranging from 500 to 5,000,000 and intrinsic viscosity, measured in 1N NaCl at 25° C. and pH 9, of greater than 0.01 dl/gm comprising:

(A) 1 0 to 99.0%, on a molar basis, of at least one unsaturated carboxylic acid, or its anhydride or salt selected from the group consisting of acrylic acid, methacrylic acid, vinyl acetic acid, allyl acetic acid, maleic acid, itaconic acid, fumaric acid, $\beta$-hydroxy ethyl acrylate, 4-methyl-4-pentenoic acid, $\alpha$-haloacrylic acid, $\beta$-carboxyethylacrylate, their salts (B) 0.1 to 25% on a molar basis, of at least one mono or di phospate ester of an unsaturated alcohol selected from the group consisting of hydroxy ethyl methacrylate phosphate ester (HEMPO), hydroxy ethyl acrylate phosphate ester (HAPO), allyl glycerol ether phosphate ester (AGEP), allyl alcohol phosphate ester (AAP) or hydroxy ethyl-$\beta$ carboxy ethyl acrylate phosphate ester; and (C) 0.1 to 25.0%, on a molar basis, of at least one unsaturated cationic-containing monomers selected from the group consisting of methacroyloxy ethyl trimethyl ammonium chloride (METAC), methacrylamido propyl trimethyl ammonium chloride (MAPTAC), acroyloxy ethyl trimethyl ammonium chloride (AETAC), acrylamido methyl propyl trimethyl ammonium chloride (AMPTAC), dimethyl diallyl ammonium chloride (DMDAAC), diethyl diallyl ammonium chloride (DEDAAC), trimethyl allyloxyethyl ammonium chloride (TAAC), or alternatively the respective methylsulfate quats and mixtures thereof.

30. An aqueous drilling fluid comprising : (I) an aqueous clay dispersion; and (II) the polymer of claim 29.

31. An aqueous drilling fluid comprising: (A) an aqueous clay dispersion; and (B) the polymer of claim 29 with molecular weight less than 50,000 and/or intrinsic viscosity less than 1.0 dl/gm said polymer used to disperse and/or deflocculate aqueous clay-based drilling fluid solids and control said drilling fluid rheology.

32. An aqueous drilling fluid comprising: (I) an aqueous clay dispersion; and (II) the polymer of claim 29 with molecular weight greater than 50,000 and/or intrinsic viscosity greater than 1.0 dl/gm said polymer used to achieve filtration control in said drilling fluid.

33. An aqueous drilling fluid comprising: (I) an aqueous clay dispersion and (II) a polymer having a molecular weight ranging from 1000 to 50,000 and intrinsic viscosity, measured in 1N NaCl at 25° C. and pH 9, between 0.01 and 0.25 dl/gm comprising:

(A) 70-98%, on a molar basis, of at least one unsaturated carboxylic acid, or its anhydride or salt selected from the group consisting of acrylic acid, methacrylic acid, maleic acid, their salts and mixtures thereof;

(B) 0.1 to 25%, on a molar basis, of at least one unsaturated sulfonic acid or its salt selected from the group consisting of 2-acrylamido-2-methyl propyl sulphonic acid, 2-methacrylamido-2-methyl propyl sulfonic acid (MAMPS), styrene sulfonic acid (SSA), vinyl sulfonic acid (VSA), sulfoalkylacrylates or methacrylates, n-sulfoalkyl acrylamides or methacrylamides, allyl sulfonic acid (ASA), methallyl sulfonic acid (MSA), allyl glycidyl ether sulfonate and mixtures thereof;

(C) 0.1 to 25.0%, on a molar basis, of at least one unsaturated cationic-containing monomers selected from the group consisting of methacroyloxy ethyl trimethyl ammonium chloride (METAC), methacrylamido propyl trimethyl ammonium chloride (MAPTAC), acroyloxy ethyl trimethyl ammonium chloride (AETAC), acrylamido methyl propyl trimethyl ammonium chloride (AMPTAC), dimethyl diallyl ammonium chloride (DMDAAC), diethyl diallyl ammonium chloride (DEDAAC), trimethyl allyloxyethyl ammonium chloride (TAAC), the respective methylsulfate quats and mixtures thereof; and (D) 0 to 29.8%, on a molar basis, of one or more unsaturated non-ionic monomers selected from the group consisting of acrylamide, methacrylamide, and allyl alcohol.

34. The drilling fluid of claim 33, wherein the polymer has been partially or totally neutralized.

35. The drilling fluid of claim 33, wherein component (A) of the polymer is selected from the group consisting of acrylic acid, methacrylic acid and maleic acid.

36. The drilling fluid of claim 33, wherein component (B) of the polymer is selected from the group consisting of 2-acrylamido-2-methyl propyl sulfonic acid, methyallyl sulfonic acid (MSA), styrene sulfonic acid (SSA), vinyl sulfonic acid (VSA), and allyl glycidyl ether sulfonate.

37. The drilling fluid of claim 33, wherein component (C) of the polymer is selected from the group consisting of methacroyloxy ethyl trimethyl ammonium chloride (METAC), methacrylamido propyl trimethyl ammonium chloride (MAPTAC) and dimethyl diallyl ammonium chloride (DMDAAC).

* * * * *